United States Patent
Nguyen et al.

(10) Patent No.: US 9,774,628 B2
(45) Date of Patent: Sep. 26, 2017

(54) METHOD FOR ANALYZING SUSPICIOUS ACTIVITY ON AN AIRCRAFT NETWORK

(71) Applicant: THE BOEING COMPANY, Chicago, IL (US)

(72) Inventors: Daniel Nguyen, Auburn, WA (US); Marissa A. Nishimoto, Seattle, WA (US); George C. Chang, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 183 days.

(21) Appl. No.: 14/829,889

(22) Filed: Aug. 19, 2015

(65) Prior Publication Data

US 2017/0054752 A1    Feb. 23, 2017

(51) Int. Cl.
*G06F 21/55* (2013.01)
*H04L 29/06* (2006.01)

(52) U.S. Cl.
CPC ...... *H04L 63/1491* (2013.01); *H04L 63/1433* (2013.01); *H04L 2463/146* (2013.01)

(58) Field of Classification Search
CPC ......... H04L 63/14; H04L 63/16; H04L 63/10; H04L 43/10
See application file for complete search history.

(56) References Cited

U.S. PATENT DOCUMENTS

| | | | |
|---|---|---|---|
| 7,903,566 B2 | 3/2011 | Knapp et al. | |
| 7,995,496 B2 | 8/2011 | Knapp et al. | |
| 7,999,245 B2 | 8/2011 | Hunt | |
| 8,050,568 B2 | 11/2011 | Hunt | |
| 8,090,264 B2 | 1/2012 | Hunt | |
| 8,364,630 B1 | 1/2013 | Hunt et al. | |
| 8,370,392 B1 | 2/2013 | Hunt | |
| 8,612,743 B2 | 12/2013 | Holland et al. | |
| 9,003,387 B2 | 4/2015 | Van Camp et al. | |
| 2007/0271614 A1* | 11/2007 | Capalik ............... | H04L 63/1441 726/23 |
| 2014/0380485 A1 | 12/2014 | Ayyagari et al. | |
| 2016/0057160 A1* | 2/2016 | Buehler .............. | H04L 63/1416 726/23 |

OTHER PUBLICATIONS

The Boeing Company, "Developing a Framework to Improve Critical Infrastructure Cybersecurity", Apr. 8, 2013.

* cited by examiner

*Primary Examiner* — Izunna Okeke
(74) *Attorney, Agent, or Firm* — Marshall, Gerstein & Borun LLP (57) ABSTRACT

An aircraft includes an aircraft network having nodes and links and a sandbox network in communication with the aircraft network. The sandbox network simulates the aircraft network and includes sandbox nodes corresponding to the nodes of the aircraft network, a first set of sandbox links corresponding to the links of the aircraft network, and a second set of sandbox links providing communication between sandbox nodes not in communication via the first set of sandbox links. Computer executable instructions, when executed, perform the steps of: generating network traffic over the sandbox network such that the sandbox network models a behavior of the aircraft network; identifying a suspicious activity on the aircraft network; routing the suspicious activity from the aircraft network to the sandbox network; and analyzing the suspicious activity as the suspicious activity traverses through the sandbox network.

15 Claims, 8 Drawing Sheets

METHOD FOR ANALYZING SUSPICIOUS ACTIVITY ON AN AIRCRAFT NETWORK

FIELD

This invention relates to analyzing suspicious activity on networks and, more specifically, to methods for analyzing suspicious activity on an aircraft network.

BACKGROUND

Typical cyber security protections and intrusion detection systems base their processes from two main methods: heuristic based detection and signature based detection. However, the problem with heuristic and signature based detection methods is that current processes (or a combination of them) do not transition smoothly onto airplane networks because many aircraft network communications are time sensitive and typical systems do not catch attack chains that start off valid. Therefore, there is a need for an intrusion detection system for aircraft that accounts for expected dataflows between avionic endpoints, takes into account the time sensitive nature of aircraft network communications, and continually monitors network traffic regardless of prior attack chain activity.

In addition, current avionics cyber security protections and intrusion detection systems are intended to statically prevent malicious activity from occurring. For example, typical cyber security protections for aircraft networks are based off of static tables that allow for specific dataflows between avionics endpoints. One problem with these protections is the lack of granularity and options provided and a second is that when a security measure is breached there is no method to dynamically detect and track the exploit for further analysis. Therefore, there is also a need for an intrusion detection system that can analyze malicious activity and respond according to the real-time data.

SUMMARY

In one embodiment of the present invention, an aircraft comprises an aircraft network and a sandbox network in communication with the aircraft network. The aircraft network includes a plurality of nodes and a plurality of links providing communication between a subset of the plurality of nodes. The sandbox network simulates the aircraft network and includes a plurality of sandbox nodes corresponding to the plurality of nodes of the aircraft network, a first set of sandbox links corresponding to the plurality of links of the aircraft network, and a second set of sandbox links providing communication between sandbox nodes not in communication via the first set of sandbox links. The aircraft network also includes computer executable instructions that, when executed by a processor, perform the steps of: generating network traffic over the sandbox network such that the sandbox network models a behavior of the aircraft network; identifying a suspicious activity on the aircraft network; routing the suspicious activity from the aircraft network to the sandbox network; and analyzing the suspicious activity as the suspicious activity traverses through the sandbox network.

In another embodiment of the present invention, a method for analyzing a suspicious activity on an aircraft network, comprises the steps of: creating a sandbox network in communication with the aircraft network, the sandbox network simulating the aircraft network and comprising a plurality of sandbox nodes corresponding to a plurality of nodes of the aircraft network, a first set of sandbox links corresponding to a plurality of links of the aircraft network that provide communication between a subset of the plurality of nodes of the aircraft network, and a second set of sandbox links providing communication between sandbox nodes not in communication via the first set of sandbox links; generating network traffic over the sandbox network such that the sandbox network models a behavior of the aircraft network; routing the suspicious activity from the aircraft network to the sandbox network; and analyzing the suspicious activity as the suspicious activity traverses through the sandbox network.

In yet another embodiment of the present invention, a method for analyzing a suspicious activity on an aircraft network, comprises the steps of: identifying the suspicious activity; routing the suspicious activity from the aircraft network to a sandbox network; and analyzing the suspicious activity as the suspicious activity traverses through the sandbox network; wherein the sandbox network simulates the aircraft network and includes a plurality of sandbox nodes corresponding to a plurality of nodes of the aircraft network, a first set of sandbox links corresponding to a plurality of links of the aircraft network between a subset of the plurality of nodes, and a second set of sandbox links providing communication between sandbox nodes not in communication via the first set of sandbox links.

The features, functions, and advantages that have been discussed can be achieved independently in various embodiments or may be combined in yet other embodiments further details of which can be seen with reference to the following description and drawings.

DESCRIPTION

Some of the example methods, and aircraft having networks that implement the example methods, provide for the detection malicious activity on a network, specifically an aircraft network. Aircraft networks are more explicit than standard networks with respect to the types of traffic and logical dataflows between avionic endpoints and the example methods utilize the unique nature of aircraft networks in order to create a more thorough system for cyber security protection and intrusion detection. Unlike current detection methods, the example methods can be implemented by taking current relevant attack vectors (attack chains) and overlaying them with logical dataflows from an aircraft network, such as an Ethernet. The results can be a threat graph, similar to a threat tree, that will be specifically tuned to each unique aircraft model and avionics endpoint option. The specificity of the data will allow for a very small footprint allowing for rapid analysis through the aircraft network. The methods can use real time event driven logic parsed by unique airplane specific data flows to generate a basis for relevant threat vectors and can implement a multi-tiered zoning system that progressively monitors and flags traffic independent of time or density.

Additional example methods, and aircraft having networks that implement the example methods, provide methods for the analysis of suspicious activity on a network, specifically an aircraft network. These example methods provide secure routing of suspicious activity to a sandbox network, which can provide the ability to detect and securely route traffic to a predetermined sandbox for future forensics and analysis. Leveraging the ability to trace attack chains and gather information regarding potential security threats will allow the airplane industry to quickly adapt and update their cyber security protections. These methods are also adaptive and will allow the suspicious activity do what it wants and go where it wants, even if it attempts to communicate through a link that is not typically available on the aircraft network, to see what it does.

One issue that can be addressed by these methods is to fill the void of relevant data that is logged for cyber forensic work by creating an environment that is reversely adaptive to current attacks. The methods can allow malicious actors to work unknowingly in a controlled environment for the purpose of gathering statistical data such as tendencies, geographical location, and threat vectors, which can be mined to aid in proactively creating new defensive measures for the current security threat trends.

As mentioned above, the re-routing and analysis of suspicious activity is preferably done in a manner that masks the routing so the malicious actor is unaware that he has been directed away from the aircraft network. Alerting the malicious actor that it has been detected can provide information about detection mechanisms, which can allow actor to modify tactics to avoid future detection, to take action to prevent information from being collected, such as information related to the actor or other malicious party, network identify or address to which information is to be sent, information re the types of attacks, and/or to take actions harmful to network, such as report information regrading network topology, malicious node detection methods, jam the network, etc.

Figure 1:
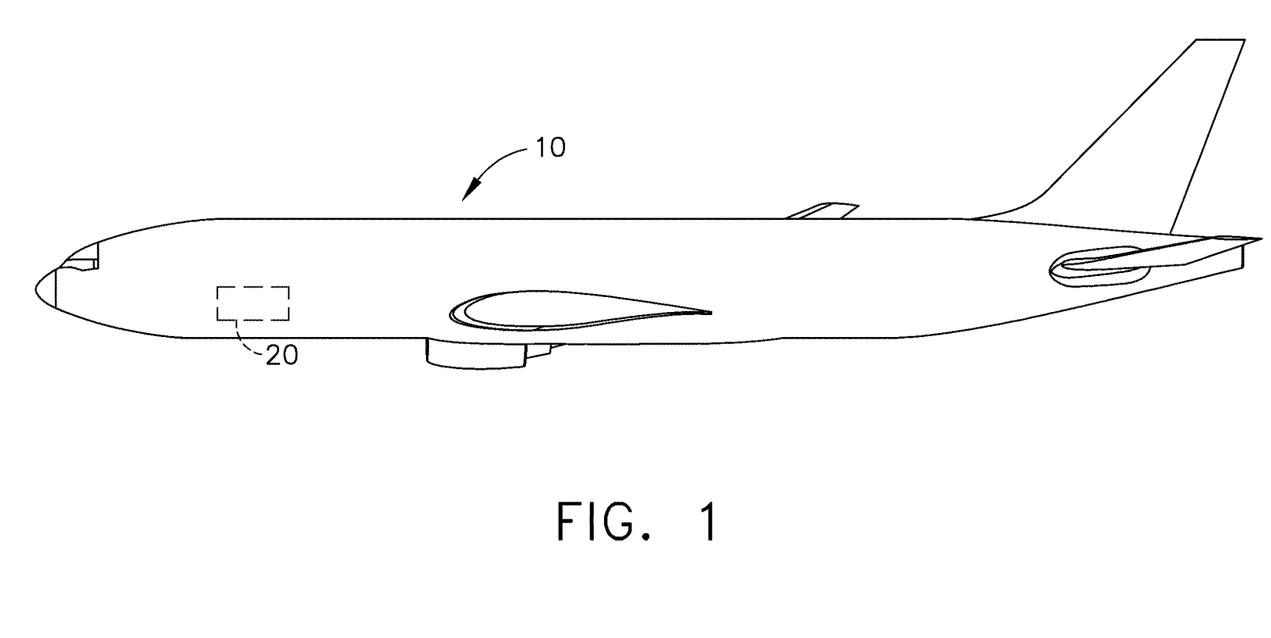
FIG. 1 is a side view of an aircraft including an example aircraft network.

Referring to FIG. 1, an example aircraft 10 is shown that includes at least one aircraft network 20, such as an Ethernet. In the example, a single aircraft network 20 is shown for simplicity, however, it is understood that aircraft 10 can have any number of individual or interconnected networks as required for the particular aircraft and its systems. In addition, aircraft 10 can be any type of aircraft.

Figure 2:
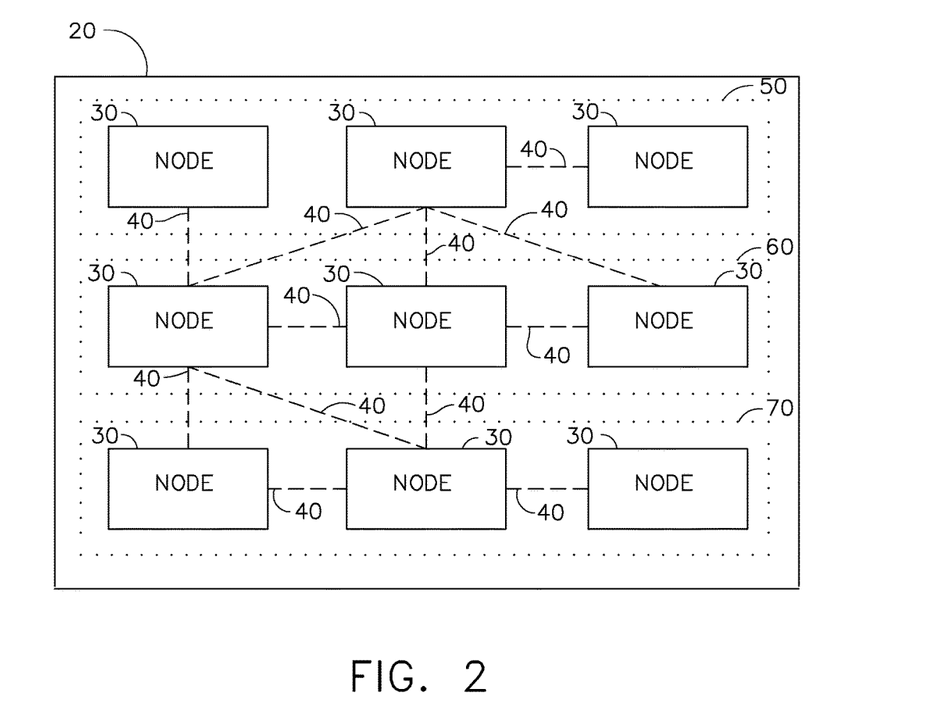
FIG. 2 is a schematic representation of the aircraft network of FIG. 1.
Figure 3:
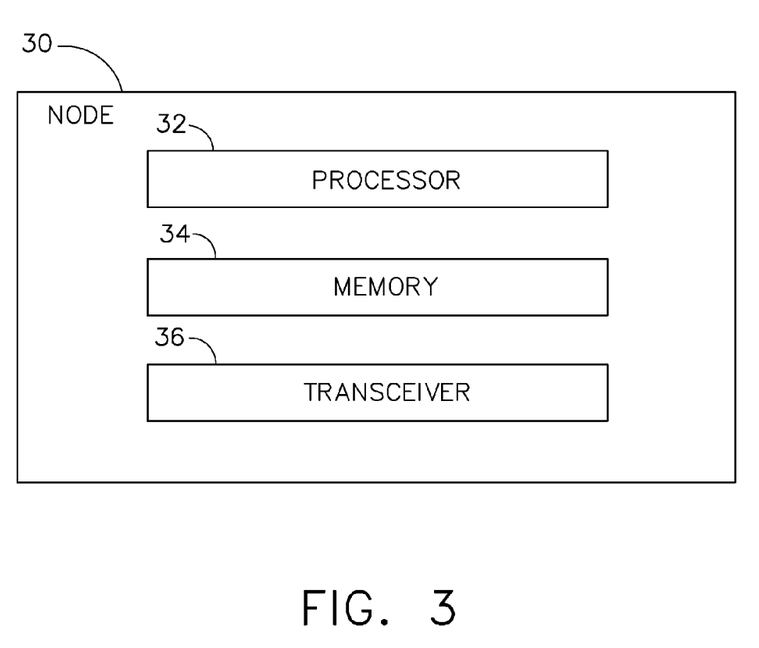
FIG. 3 is a schematic representation of an example node of FIG. 2.

As can be seen in FIGS. 2 and 3, aircraft network 20 generally includes a plurality of nodes 30, where certain nodes 30 are connected through links 40, which can be any type of connection that allow communication between nodes 30. In the example, nine nodes 30 are shown for simplicity, however, it is understood that aircraft network 20 can have any number of nodes as required.

Nodes 30 can be some type of sensor, actuator, and/or other control device and in aircraft 10, for example, a line replaceable unit (LRU), such as a proximity detector, ice detector, control panel, sensor, motor controller, smart sensor (e.g., air data monitor), etc. In particular, a portion or all of nodes 30 can be avionics endpoints. Nodes 30 will generally be similar in structure and include at least one processor 32, at least one memory 34 to store data and computer executable instruction to be executed by processor 32 to perform the methods described herein, and a transceiver 36 to allow nodes 30 to send and receive communications over links 40.

In aircraft network 20, nodes 30 are segregated or organized into a plurality of zones 50, 60, 70, where each zone 50, 60, 70 defines a different level of potential threat aircraft network 20. For example, nodes 30 can be organized by criticality of performance of the nodes to the operation of aircraft 10 and the potential risks associated with a threat to the nodes. In the example shown in FIG. 2, zone 50 may be an air critical domain that includes nodes 30 involved with flight control and other avionics systems, zone 60 may be less critical to the operation of aircraft 10 than zone 50 and include nodes 30 related to an aircraft information service domain (AISD), and zone 70 may be least critical to the operation of aircraft 10 than zones 50, 60 and comprise a passenger accessible zone that includes nodes 30 involved with in-flight entertainment.

Figure 4:
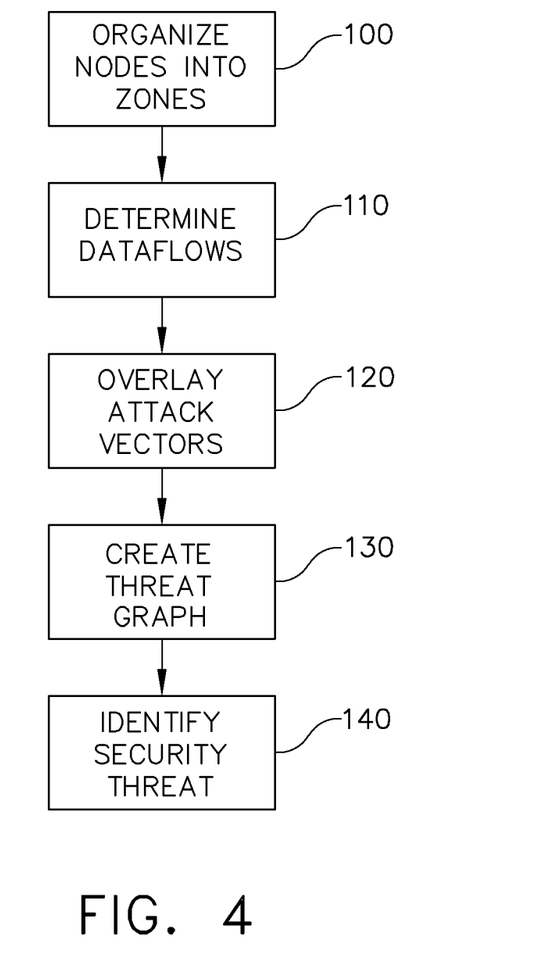
FIG. 4 is a flowchart showing an example method for detecting malicious activity on an aircraft network.

Referring to FIG. 4, one example method for detecting malicious activity on aircraft network 20 is shown. In this example, at Step 100, nodes 30 are organized into different zones 50, 60, 70, each defining a different level of potential threat to aircraft network 20, as described above.

Based on the nodes 30 and links 40 for the particular aircraft network 20, the logical dataflows for communications over aircraft network 20 are determined at Step 110 and potential attack vectors are overlaid onto the dataflow model at Step 120. In this example, the attack vectors include potential threats or malicious activity that traverse between nodes 30 in different zones 50, 60, 70 and those that traverse between nodes 30 organized within the same zone 50, 60, 70. Typical cyber security protections and intrusion detection systems often identify particular network activity as valid if the communications occur in the same zone when they are initiated. This can lead to some malicious activity being missed if an attack chain starts off with communications within a particular zone and then attempts to move between zones at a later time. However, using attack vectors that move between zones and those that move within a given zone will catch potential malicious activity, even if that activity initially starts off as valid. Therefore, activity occurring within a given zone (or threat hierarchy) is still a threat that can be identified, rather than only monitoring and identifying threats that attempt to move between zones.

At Step 130, a threat graph is created based on the dataflows and the plurality of potential attack vectors. The threat graph can have separate security threat identification processes for each of zones 50, 60, 70. For example, if zone 50 is an air critical domain that involves flight control and avionics systems, there may be fewer threat identification processes used for communications between nodes 30 in zone 50 since there are a smaller number of acceptable communications expected in zone 50 and communications within zone 50 are time sensitive and need to occur quickly. Conversely, if zone 70 is a passenger accessible zone, such as the in-flight entertainment system, there may be a greater number of threat identification processes used for communications expected in zone 70 since there would be a larger number of potential communications that could occur in zone 70, there is a greater chance of an outside user accessing zone 70, and the communications within zone 70 are less time sensitive. Having separate security threat identification processes for each zone 50, 60, 70 can reduce the time required to scan for and identify malicious activity in zones that include time sensitive communications and can provide more robust threat identification in zones that that provide more access to the public and where communication between nodes is not as time sensitive.

Finally, at Step 140, security threat events are identified based on the threat graph. For example, the security threat could be a malicious activity or data packet that is traversing between nodes 30 and is attempting to move between zones 50, 60, 70. Once a security threat has been identified, any number of steps can be taken to address the identified threat, such as routing the threat to a sandbox network and analyzing the security threat to obtain information and analyze the security threat, as described in more detail below.

Figure 5:
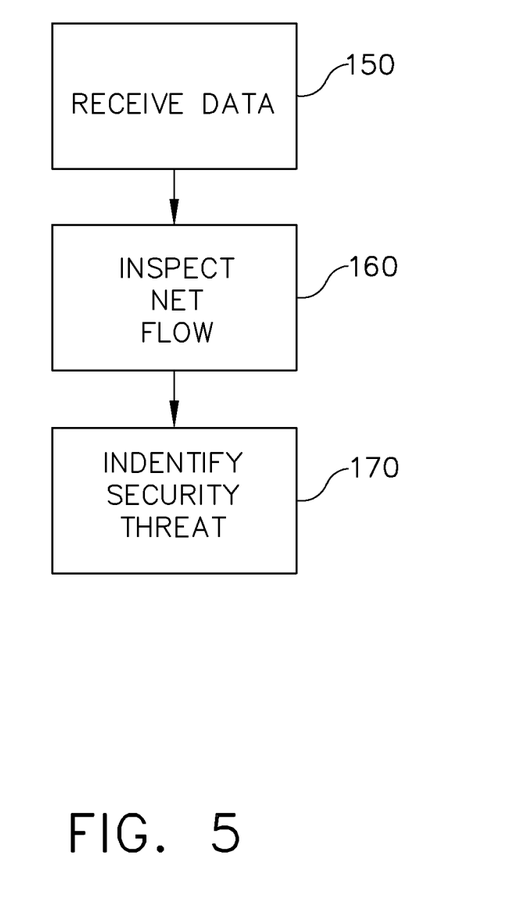
FIG. 5 is a flowchart showing another example method for detecting malicious activity on an aircraft network.

Referring to FIG. 5, another example method for detecting malicious activity on aircraft network 20 is shown, once aircraft network 20 has been set up as described above with nodes 30 organized into multiple predetermined zones 50, 60, 70 and potential attack vectors overlaid onto the mode dataflow of aircraft network 20, which can be used to produce an attack graph, such as a threat graph. As discussed above, the threat graph can have separate security threat identification processes for each of zones 50, 60, 70 and can also represent a hierarchy of risk level.

In this example, at Step 150, data is received from one of nodes 30. The source location of the data, such as a login interface of an avionics unit, is then used to inspect net flow across aircraft network 20 at Step 160. For example, access, network, and user boundary violations could be monitored.

At Step 170, a security event, such as a malicious activity or network packet, is identified based on the received data, the net flow, the potential attack vectors, and the model dataflow of aircraft network 20. Once a security threat has been identified, any number of steps can be taken to address the identified threat, such as routing the threat to a sandbox network and analyzing the security threat to obtain information and analyze the security threat, as described in more detail below.

As described above, in this example the plurality of potential attack vectors include potential threats or malicious activity that traverse between nodes 30 in different zones 50, 60, 70 and those that traverse between nodes 30 organized within the same zone 50, 60, 70, which can identify potential malicious activity, even if that activity initially starts off as valid, unlike current solutions. Therefore, activity occurring within a given zone (or threat hierarchy) is still a threat that can be identified, rather than only monitoring and identifying threats that attempt to move between zones.

As mentioned above, once a security threat or other malicious activity has been identified, any number of steps can be taken to address the identified threat. For example, the malicious activity, such as a suspicious data packet, can be analyzed to obtain forensic data that can be used to improve future threat identification processes.

Figure 6:
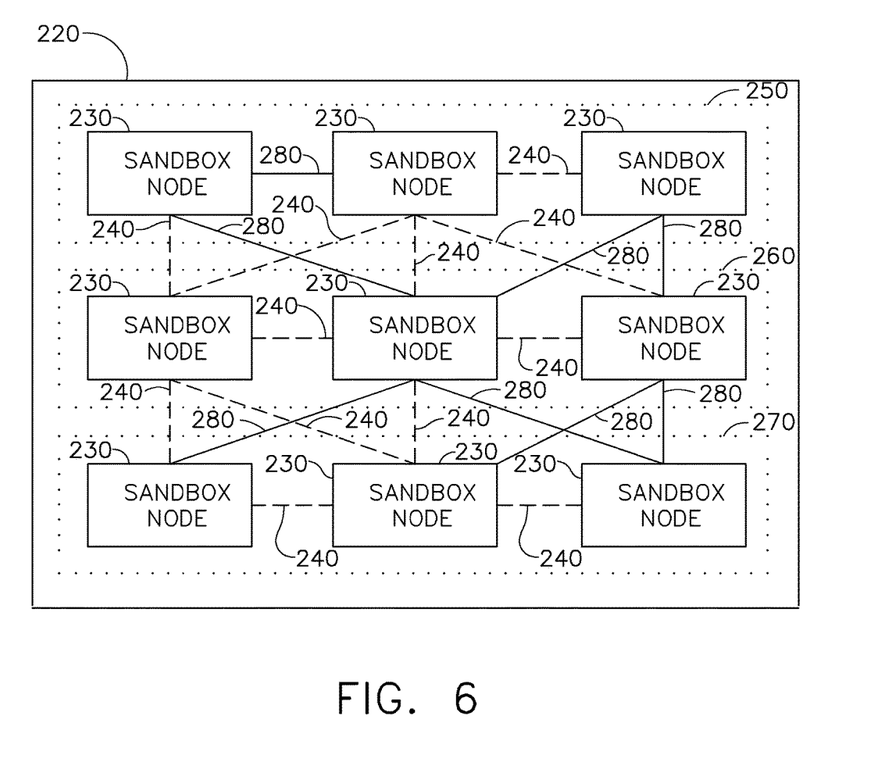
FIG. 6 is a schematic representation of an example sandbox network.
Figure 7:
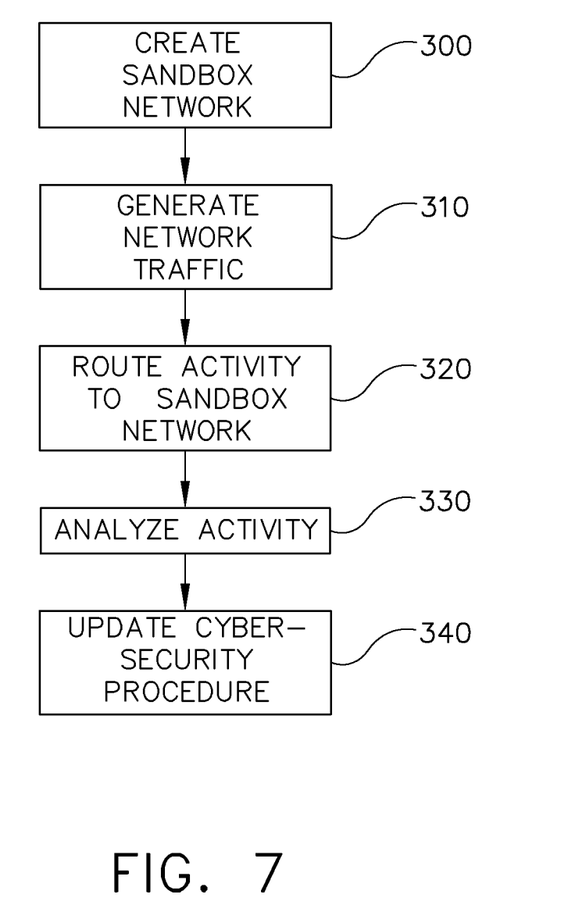
FIG. 7 is a flowchart showing an example method for analyzing a suspicious activity on an aircraft network.

Referring to FIG. 7, one example method for analyzing a suspicious activity identified on aircraft network 20, or other identified security threat or malicious activity, is shown. The suspicious activity can originate from a node 30, from a user interface to an avionics system, or from any other potential source. In this example, at Step 300, a sandbox network 220 is created that is in communication with aircraft network 20 and located on aircraft 10. As can be seen in FIG. 6, sandbox network 220 simulates aircraft network 20 and includes sandbox nodes 230 that correspond and are identical to nodes 30 of aircraft network 20. Like nodes 30 of aircraft network 20, sandbox nodes 230 of sandbox network 220 can be segregated or organized into a plurality of zones 250, 260, 270 corresponding to zones 50, 60, 70 of aircraft network 20. A first set of sandbox links 240 (dashed connectors) provide communications between a subset of sandbox nodes 230 and correspond and are identical to links 40 of aircraft network 20. However, sandbox network 220 also includes a second set of sandbox links 280 (solid connectors) that provide communications between sandbox nodes 230 that are not in communication via first set of sandbox links 240.

At Step 310, network traffic is generated over sandbox network 220 so that the behavior of sandbox network 220 models the behavior of aircraft network 20.

Once sandbox network 220 has been set up and a suspicious activity has been identified, through the methods described above or any other appropriate method, the suspicious activity is routed from aircraft network 20 to sandbox network 220 at Step 320. Preferably, the routing of the suspicious activity from aircraft network 20 to sandbox network 220 is transparent to the source of the suspicious activity so that the source is not alerted that the suspicious activity has been detected, re-routed, or is being monitored, by any manner that is well known to those skilled in the art.

At Step 330, the suspicious activity is then analyzed by allowing it to traverse through sandbox network 220. For example, analysis of the suspicious activity could include collecting forensic data about the suspicious activity, such as communications traffic, attack chains, tendencies, time logs, frequency logs, reaction logs, and geographical location of the source of the suspicious activity. Again, as the suspicious activity traverses through sandbox network 220, the fact that it is traversing through sandbox network 220 rather than aircraft network 20 should be transparent to the source of the suspicious activity. Furthermore, having second set of sandbox links 280 will allow the suspicious activity to traverse through sandbox network 220 along paths that would not be possible in aircraft network 20, which can allow the suspicious activity to take actions that would not be possible on aircraft network 20 and can provide additional information regarding the potential threat or malicious activity and possible insight into the purpose of the malicious activity.

Computer executable instructions stored on aircraft network 20 and/or sandbox network 220 could be executed by a processor to implement Steps 310-330.

If desired, the analysis of the suspicious activity and the information gathered in the analysis can then be used to create, adapt, or update cyber-security procedures based on the forensic data collected, as shown by Step 340.

Figure 8:
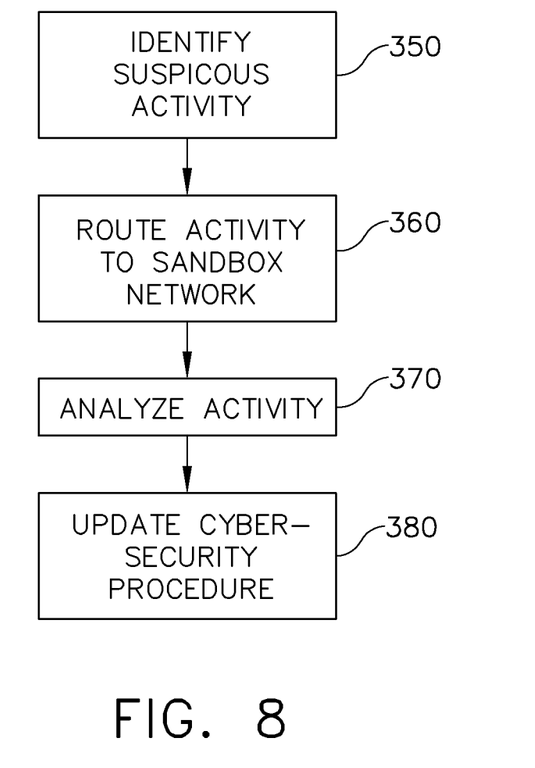
FIG. 8 is a flowchart showing another example method for analyzing a suspicious activity on an aircraft network.

Referring to FIG. 8, another example method for analyzing a suspicious activity identified on aircraft network 20, or other identified security threat or malicious activity, is shown, once sandbox network 220 has been set up, as described above.

In this example, at Step 350, a suspicious activity on aircraft network 20 is identified, through the methods described above or any other appropriate method.

Once identified, the suspicious activity is routed from aircraft network 20 to sandbox network 220 at Step 360. As discussed above, the routing of the suspicious activity from aircraft network 20 to sandbox network 220 is preferably transparent to the source of the suspicious data packet.

At Step 370, the suspicious activity is then analyzed by allowing it to traverse through sandbox network 220, as described in Step 330 above.

Computer executable instructions stored on aircraft network 20 and/or sandbox network 220 could be executed by a processor to implement Steps 360-370.

If desired, the analysis of the suspicious activity and the information gathered in the analysis can then be used to create, adapt, or update cyber-security procedures based on the forensic data collected, as shown by Step 380.

While various embodiments have been described above, this disclosure is not intended to be limited thereto. Variations can be made to the disclosed embodiments that are still within the scope of the appended claims.

What is claimed is:

1. A method for analyzing a suspicious activity on an aircraft network, comprising the steps of:
    creating a sandbox network in communication with the aircraft network, the sandbox network simulating the aircraft network and comprising a plurality of sandbox nodes corresponding to a plurality of nodes of the aircraft network, a first set of sandbox links corresponding to a plurality of links of the aircraft network that provide communication between a subset of the plurality of nodes of the aircraft network, and a second set of sandbox links providing communication between sandbox nodes not in communication via the first set of sandbox links;
    generating network traffic over the sandbox network such that the sandbox network models a behavior of the aircraft network;
    routing the suspicious activity from the aircraft network to the sandbox network, wherein the suspicious activity originates from a node on the aircraft network or a user interface to an avionics system; and
    analyzing the suspicious activity as the suspicious activity traverses through the sandbox network, wherein analyzing the suspicious activity comprises collecting forensic data about the suspicious activity.

2. The method of claim 1, wherein at least a portion of the plurality of nodes comprise line replaceable units.

3. The method of claim 1, wherein routing the suspicious activity is transparent to source of the suspicious activity.

4. The method of claim 1, wherein the forensic data comprises at least one of communications traffic, attack chains, tendencies, and geographical location of the source of the suspicious activity.

5. The method of claim 1, further comprising the step of creating, adapting, or updating a cyber-security procedure based on the collected forensic data.

6. A method for analyzing a suspicious activity on an aircraft network, comprising the steps of:
    identifying the suspicious activity originating from a node on the aircraft network or a user interface to an avionics system;
    routing the suspicious activity from the aircraft network to a sandbox network; and
    analyzing the suspicious activity as the suspicious activity traverses through the sandbox network; wherein
        the sandbox network simulates the aircraft network and includes a plurality of sandbox nodes corresponding to a plurality of nodes of the aircraft network, a first set of sandbox links corresponding to a plurality of links of the aircraft network between a subset of the plurality of nodes, and a second set of sandbox links providing communication between sandbox nodes not in communication via the first set of sandbox links; and
        analyzing the suspicious activity comprises collecting forensic data about the suspicious activity.

7. The method of claim 6, wherein at least a portion of the plurality of nodes of the aircraft network comprise line replaceable units.

8. The method of claim 6, wherein routing the suspicious activity is transparent to source of the suspicious activity.

9. The method of claim 6, wherein the forensic data comprises at least one of communications traffic, attack chains, tendencies, and geographical location of the source of the suspicious activity.

10. The method of claim 6, further comprising the step of creating, adapting, or updating a cyber-security procedure based on the collected forensic data.

11. An aircraft, comprising:
    an aircraft network comprising a plurality of nodes and a plurality of links providing communication between a subset of the plurality of nodes;
    a sandbox network in communication with the aircraft network, the sandbox network simulating the aircraft network and comprising a plurality of sandbox nodes corresponding to the plurality of nodes of the aircraft network, a first set of sandbox links corresponding to the plurality of links of the aircraft network, and a second set of sandbox links providing communication between sandbox nodes not in communication via the first set of sandbox links; and
    computer executable instructions that, when executed by a processor, perform the steps of:
        generating network traffic over the sandbox network such that the sandbox network models a behavior of the aircraft network;
        identifying a suspicious activity on the aircraft network, the suspicious activity originating from one of the plurality of nodes on the aircraft network or a user interface to an avionics system;
        routing the suspicious activity from the aircraft network to the sandbox network; and
        analyzing the suspicious activity as the suspicious activity traverses through the sandbox network, wherein analyzing the suspicious activity comprises collecting forensic data about the suspicious activity.

12. The aircraft of claim 11, wherein the aircraft network comprises an Ethernet.

13. The aircraft of claim 11, wherein at least a portion of the plurality of nodes comprise line replaceable units.

14. The aircraft of claim 11, wherein routing the suspicious activity is transparent to source of the suspicious activity.

15. The aircraft of claim 11, further comprising the step of creating, adapting, or updating a cyber-security procedure based on the collected forensic data.

* * * * *